(12) United States Patent
Tone et al.

(10) Patent No.: US 6,640,306 B1
(45) Date of Patent: Oct. 28, 2003

(54) DATA TRANSMITTER, DATA REPRODUCTION METHOD, TERMINAL, AND METHOD FOR TRANSFERRING DATA TRANSMITTER

(75) Inventors: Nobuhiro Tone, Tokyo (JP); Toshiyuki Arai, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/284,406

(22) PCT Filed: Aug. 12, 1998

(86) PCT No.: PCT/JP98/03585

§ 371 (c)(1),
(2), (4) Date: Apr. 13, 1999

(87) PCT Pub. No.: WO99/09718

PCT Pub. Date: Feb. 25, 1999

(30) Foreign Application Priority Data

Aug. 15, 1997 (JP) .............................................. 9-220398

(51) Int. Cl.⁷ ................................................ H04L 9/30
(52) U.S. Cl. ....................................... 713/201; 713/200
(58) Field of Search ................................. 713/200, 201

(56) References Cited

U.S. PATENT DOCUMENTS

| | | | | |
|---|---|---|---|---|
| 5,414,721 A | * | 5/1995 | Fukui | 714/819 |
| 5,469,564 A | * | 11/1995 | Junya | 713/202 |
| 5,987,607 A | * | 11/1999 | Tsumura | 713/200 |
| 6,002,694 A | * | 12/1999 | Yoshizawa et al. | 370/486 |
| 6,249,532 B1 | * | 6/2001 | Yoshikawa et al. | 370/486 |
| 6,278,984 B1 | * | 8/2001 | Itami et al. | 705/57 |
| 6,298,443 B1 | * | 10/2001 | Colligan et al. | 713/200 |

FOREIGN PATENT DOCUMENTS

| | | | |
|---|---|---|---|
| DE | 4404327 | 8/1995 | .......... H04M/11/06 |
| EP | 0778513 | 6/1997 | ............. G06F/1/00 |
| JP | 61129939 | 6/1986 | |
| JP | 63195754 | 8/1988 | |
| JP | 0487492 | 3/1992 | |
| JP | 4108451 | 6/1992 | |

* cited by examiner

Primary Examiner—Ly V. Hua
(74) Attorney, Agent, or Firm—Jay H. Maioli (57) ABSTRACT

A transmitting unit has a first storing portion for storing a plurality of data programs, and a data generating portion for adding first identification data to a data program selected corresponding to selection data that is input by a user from the plurality of data programs stored in the first storing portion. A terminal unit has an operating portion for inputting selection data for selecting users's desired data from the plurality of data programs stored in the first storing portion, a second storing portion for storing data to which the first identification data transmitted from the transmitting unit is added and for storing second identification data that is unique to the terminal unit, a reproducing portion for reproducing data that is read from the second storing portion, and a controlling portion for comparing the first identification data added to the data that is read from the second storing portion with the second identification data that is stored in the second storing portion and controlling a reproducing operation of the reproducing portion corresponding to the compared results when the data that is read from the second storing portion is reproduced. Thus, data can be protected and its ownership can be transferred.

25 Claims, 10 Drawing Sheets

| OWNER ID | NUMBER OF TRANSFER TIMES | VALID NUMBER OF TRANSFER TIMES | MUSIC DATA |

DATA TRANSMITTER, DATA REPRODUCTION METHOD, TERMINAL, AND METHOD FOR TRANSFERRING DATA TRANSMITTER

TECHNICAL FIELD

The present invention relates to a data transmission apparatus, a data reproducing method, a terminal unit, and a transferring method of the data transmission apparatus that are suitable for an information transmission system that causes a transmitting unit that stores information to user terminal units.

BACKGROUND ART

A music data circulating service that circulates music data to user terminal units through an ISDN (Integrated Service Digital Network) line, a communication satellite, or the like has been proposed. In such a system, a transmitting unit that circulates music data is disposed on the network. User terminal units and the transmitting unit are connected with a communication medium such as an ISDN line, a communication satellite, or the like. When a user terminal unit and the transmitting unit are connected, a menu screen and a search screen that allow the user to search music data are displayed on the user terminal unit. With reference to the menu screen and the search screen, the user selects music data that he or she wants to purchase. Corresponding to the user's request, digital audio data of the desired music is circulated from the transmitting unit to the user terminal unit through the communication medium. When such a system is accomplished, the user can obtain his or her favorite music data. In addition, when the user downloads music data from the transmitting unit, he or she is charged for the music data.

As described above, when such a music circulating system becomes common, users can purchase desired music data through the communication network. However, in this case, music data obtained through the communication network may be illegally copied and sold to other people. Thus, the copyright of music data may be infringed. In addition, when such a music circulating system becomes more common, music data is extensively traded. Consequently, music data created or downloaded by a user may be transferred to another person through the communication network. When music data is transferred, its copyright should be properly protected. In addition, the copyright should be easily transferred.

Therefore, an object of the present invention is to provide a data transmission apparatus, a data reproducing method, a terminal unit, and a transferring method of a data transmission apparatus that allow data in a system that downloads data transmitted from a transmitting unit through a communication network to be protected.

DISCLOSURE OF THE INVENTION

The present invention is a transmission apparatus, comprising a transmitting unit having a first storing portion for storing a plurality of data programs, and a data generating portion for adding first identification data to a data program selected corresponding to selection data that is input by a user from the plurality of data programs stored in the first storing portion, and at least one terminal unit having an operating portion for inputting selection data for selecting users's desired data from the plurality of data programs stored in the first storing portion, a second storing portion for storing data to which the first identification data transmitted from the transmitting unit is added and for storing second identification data that is unique to the terminal unit, a reproducing portion for reproducing data that is read from the second storing portion, and a controlling portion for comparing the first identification data added to the data that is read from the second storing portion with the second identification data that is stored in the second storing portion and controlling a reproducing operation of the reproducing portion corresponding to the compared results when the data that is read from the second storing portion is reproduced.

In addition, the present invention is a data reproducing method for a data transmission apparatus, comprising the steps of causing a transmitting unit to read a data program corresponding to user's selection data that is transmitted from at least one terminal unit from a plurality of data programs stored in a first storing portion, adding first identification data to the data that is read from the first storing portion and causing the transmitting unit to transmit the resultant data, causing the terminal unit to receive the data transmitted form the transmitting unit and storing the received data to a second storing portion, and causing the terminal unit to compare second identification data that is unique to the terminal unit and stored therein with the data that is read from the second storing portion and controlling a reproducing operation of the data that is read from the second storing portion corresponding to the compared result when the data that is stored in the second storing portion is reproduced.

In addition, the present invention is a terminal unit, comprising an operating portion for inputting selection data for selecting users's desired data from a plurality of data programs stored in a transmitting unit, a storing portion for storing data to which the first identification data transmitted from the transmitting unit is added and for storing second identification data that is unique to the terminal unit, a reproducing portion for reproducing data that is read from the storing portion, and a controlling portion for comparing the first identification data added to the data that is read from the storing portion with the second identification data that is stored in the storing portion and controlling a reproducing operation of a reproducing portion corresponding to the compared results when the data that is read from the second storing portion is reproduced by the reproducing portion.

In addition, the present invention is a transferring method for a data transmission apparatus, comprising the steps of connecting at least a first terminal unit and a second terminal unit in such a manner that the first terminal unit communicates with the second terminal unit, each of the first terminal unit and the second terminal unit having a storing portion for storing a plurality of data programs, identification data and ownership transferred times data being added to each of the data programs, when one of the data programs is transmitted from the storing portion of the first terminal unit to the storing portion of the second terminal, causing the second terminal unit to transmit unique identification data of the second terminal unit to the first terminal unit, and changing the identification data of the data program that is read from the storing portion of the first terminal unit to the identification data of the second terminal unit and transmitting the data program of which the identification data of the first terminal unit has been changed to the identification data of the second terminal unit.

In addition, the present invention is a transferring method for a data transmission apparatus, comprising the steps of connecting at least a first terminal unit and a second terminal unit in such a manner that the first terminal unit communicates with the second terminal unit, each of the first terminal unit and the second terminal unit having a storing portion for storing a plurality of data programs, identification data and ownership transferred times data being added to each of the data programs, when the data program stored in the storing portion of the first terminal unit is transferred to the storing unit of the second terminal unit, reading the ownership transferred times data from the data program that is read from the first terminal unit, and determining whether or not the first terminal unit is permitted to transfer the data program to the second terminal unit corresponding to the ownership transferred times data.

BEST MODES FOR CARRYING OUT THE INVENTION

Next, with reference to the accompanying drawings, an embodiment of the present invention will be described. First of all, an outline of an overall information transmission system according to the present invention will be described.

Figure 1:
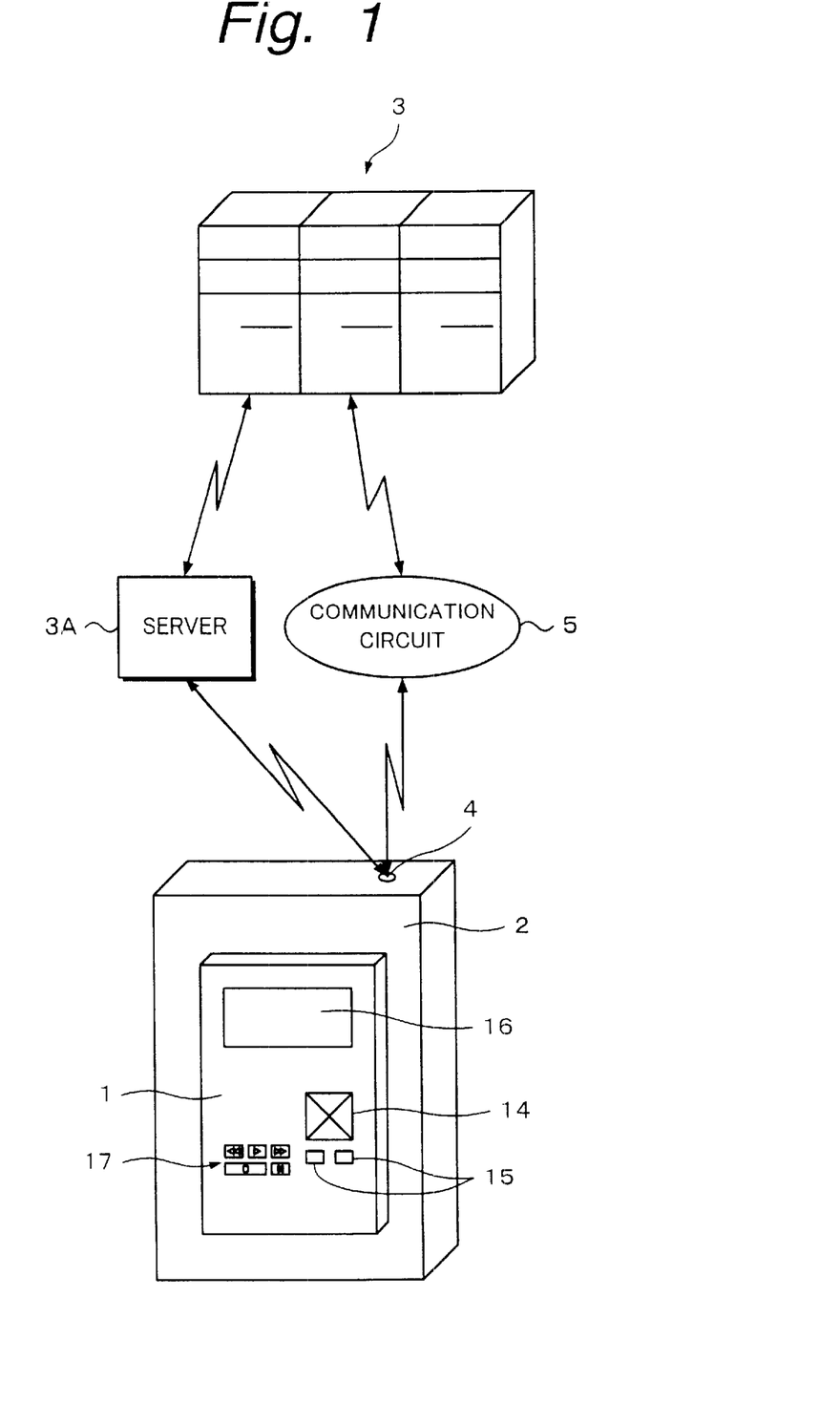
FIG. 1 is a block diagram showing the overall structure of a system according to the present invention.

Referring to FIG. 1, a transmitting unit 3 has a record medium such as a hard disk or an optical disc that stores a large amount of data or information. The transmitting unit 3 receives user's request information through a communication line 5, searches data or information corresponding to the request information from information or data stored in the record mediums, and transmits the searched data or information corresponding to the request information to a receiving unit 2 through the communication line 5. Examples of the communication line 5 are an ISDN (Integrated Services Digital Network) line, a CATV (Cable Television, Community Antenna Television) line, a communication satellite, and a telephone line. The receiving unit 2 receives data or information from the transmitting unit 3, outputs the received data or information to a portable terminal unit 1 connected to the receiving unit 2. The portable terminal unit 1 has a record medium such as a hard disk, an optical disc, or a semiconductor memory that copies or records data received from the transmitting unit 3. With such a system, a so-called data on-demand function is accomplished. In this embodiment, examples of data or information are audio information, text information, image information, and picture information (hereinafter, such data or information is generally referred to as data).

Figure 7:
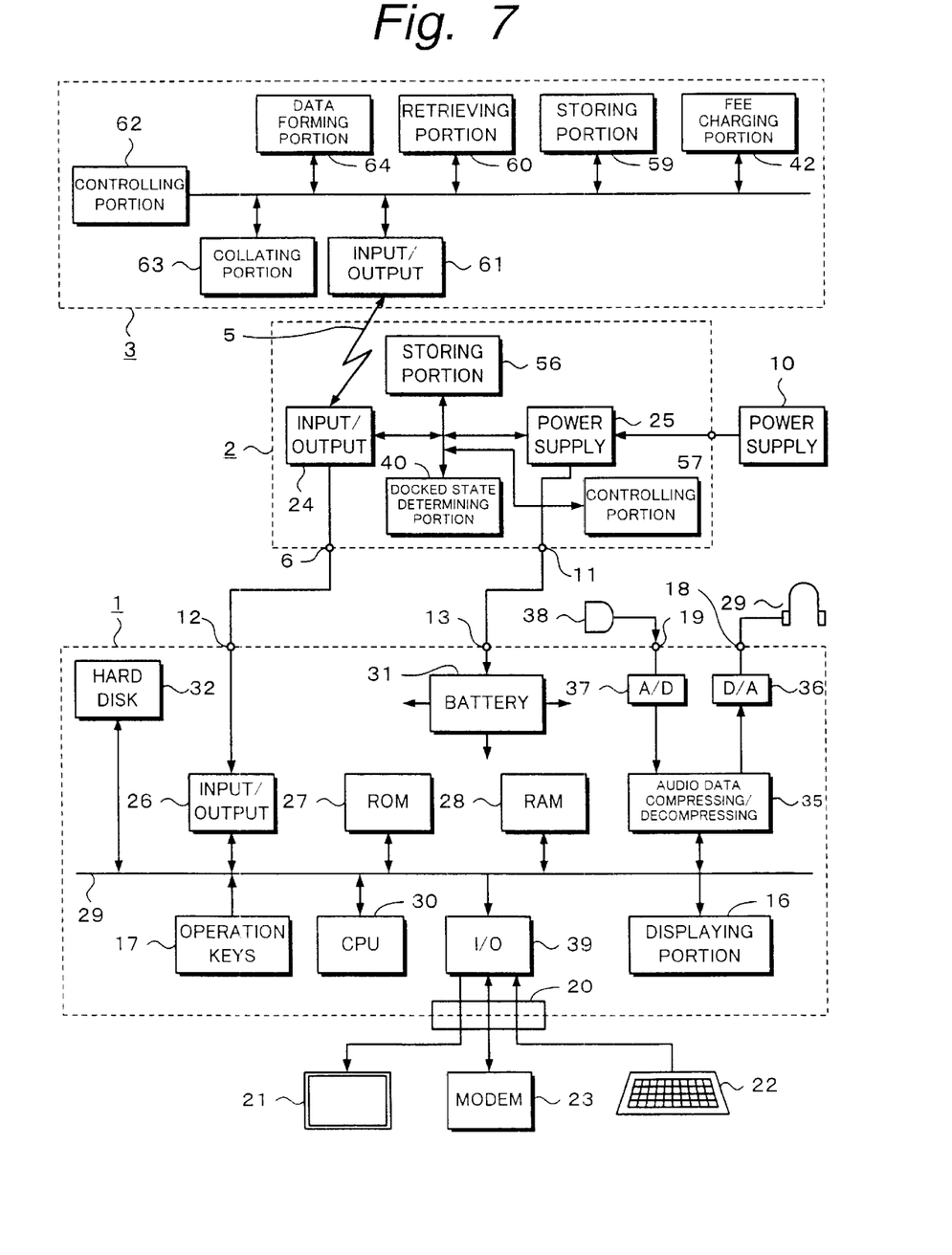
FIG. 7 is a block diagram showing the overall structure of a system having a terminal unit, a receiving unit, and a transmitting unit according to the present invention.

As shown in FIG. 7, the transmitting unit 3 comprises a storing portion 59 and a searching portion 60. The storing portion 59 stores a large amount of data. The searching portion 60 searches desired data from data stored in the storing portion 59. As the storing portion 59, it is possible to use a magnetic tape used in a broadcasting station. However, to accomplish the on-demand function that is one feature of the present invention, it is preferred to use a hard disk, a semiconductor memory, an optical disc, an optical magnetic disc, or the like that can be random-accessed. A controlling portion 62 controls the overall operations of the transmitting unit 3.

In FIG. 1, examples of the communication line 5 through which data is circulated from the transmitting unit 3 are an ISDN line, a CATV line, a communication satellite line, a telephone line, and a radio communication line. To accomplish the on-demand function, as the communication circuit 5, a bidirectional communication is required. However, when a conventional communication satellite or the like is used, data is unidirectionally transmitted from a base station side to a terminal unit side or vice versa. Thus, to accomplish a bidirectional communication, two or more communication lines or two or more types of communication lines 5 may be used.

When the transmitting unit 3 directly transmits data to the receiving units 2 through the communication line 5, since the transmitting unit 3 should be connected to all the receiving units 2 of the system shown in FIG. 1, the cost of the infrastructure becomes high. In addition, request information of terminal units 1 concentrates at the transmitting unit 3. Thus, when the transmitting unit 3 transmits data corresponding to a large amount of request information to the receiving units 2, the load applied to the transmitting unit 3 may become high.

To solve such a problem, a server 3A is disposed between the transmitting unit 3 side and the receiving unit 2 side. The server 3A temporarily stores data. Thus, the line length is shortened. In addition, predetermined data is downloaded from the transmitting unit to the server 3A beforehand. Data corresponding to request information received from a receiving unit 2 is transmitted from the server 3A. Thus, data transmitted from the server 3A is downloaded to a relevant portable terminal unit 1.

Next, with reference to FIGS. 2 to 6, the structures of the receiving unit 2 and the portable terminal unit 1 that is attachable thereto will be described.

Figure 2:
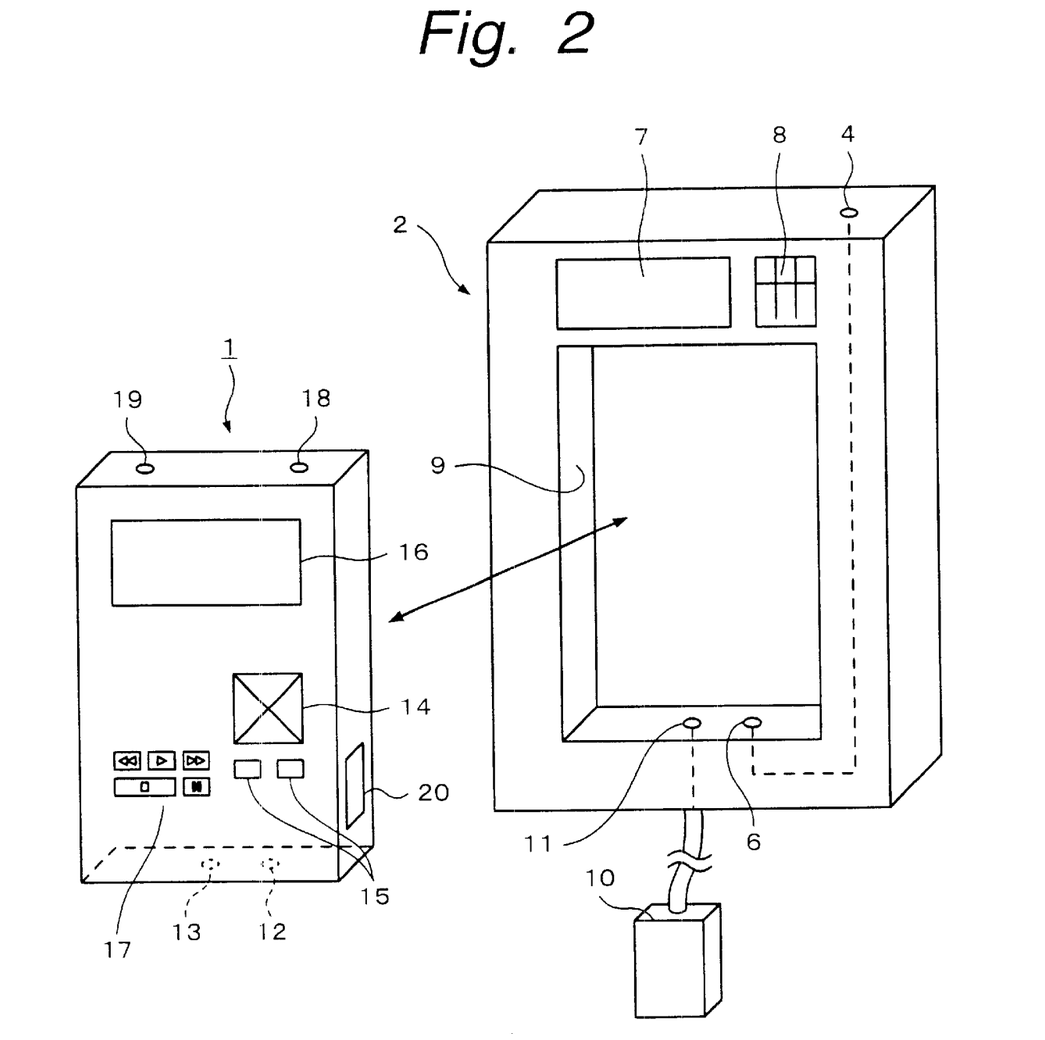
FIG. 2 is a perspective view showing the structures of a receiving unit and a terminal unit that is attachable to the receiving unit according to the present invention.

The receiving units 2 are disposed in for example kiosks of train stations, convenience stores, public telephone stands, and individual homes. Each receiving unit 2 comprises a displaying portion 7, an operating portion 8, and an attaching portion 9. The displaying portion 7 is a liquid crystal display unit or the like. The operating portion 8 allows the user to select desired information. The attaching portion 9 attaches the portable terminal unit 1. As shown in FIG. 2, the attaching portion 9 is preferably disposed on the receiving unit 2. Alternatively, with a connection cable, the attaching portion 9 may be omitted.

When an operating portion and a displaying portion of the portable terminal unit 1 are used, the displaying portion 7 and the operating portion 8 may be omitted from the receiving unit 2. The attaching portion 9 has an input/output terminal 6 and a power supply terminal 11. The input/output terminal 6 is used to input/output data between the receiving unit 2 and the portable terminal unit 1. When the portable terminal unit 1 is attached to the receiving unit 2, electricity is automatically charged to a secondary battery as a power supply of the portable terminal unit 1 through the power supply terminal 11 connected to a power supply 10 of the receiving unit 2.

As shown in FIG. 2, the entire portable terminal unit 1 is attachable to the receiving unit 2. However, it is not necessary to attach the entire portable terminal unit 1 to the receiving unit as long as data is input and output therebetween and electricity is supplied to the portable terminal unit 1. Thus, the portable terminal unit 1 may have a small connecting portion disposed at a bottom portion, a side portion, or an edge portion thereof so as to connect a power cable and an information input/output cable to the receiving unit 2.

Figure 3:
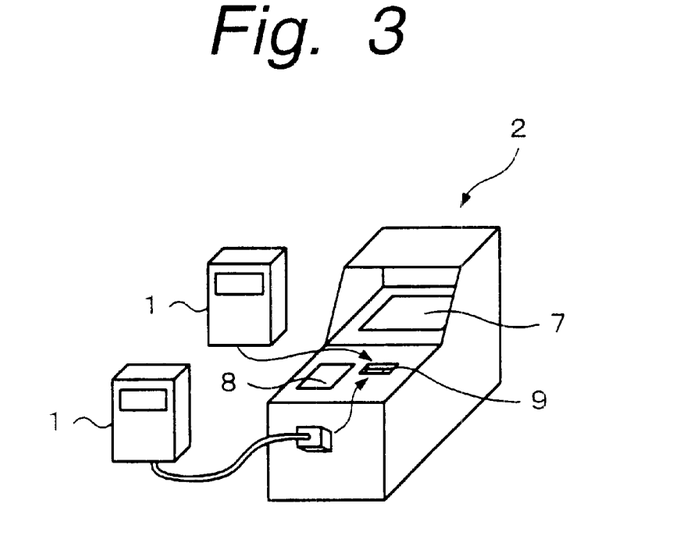
FIG. 3 is a perspective view showing the structures of a receiving unit and a terminal unit attached to the receiving unit according to another embodiment of the present invention.
Figure 4:
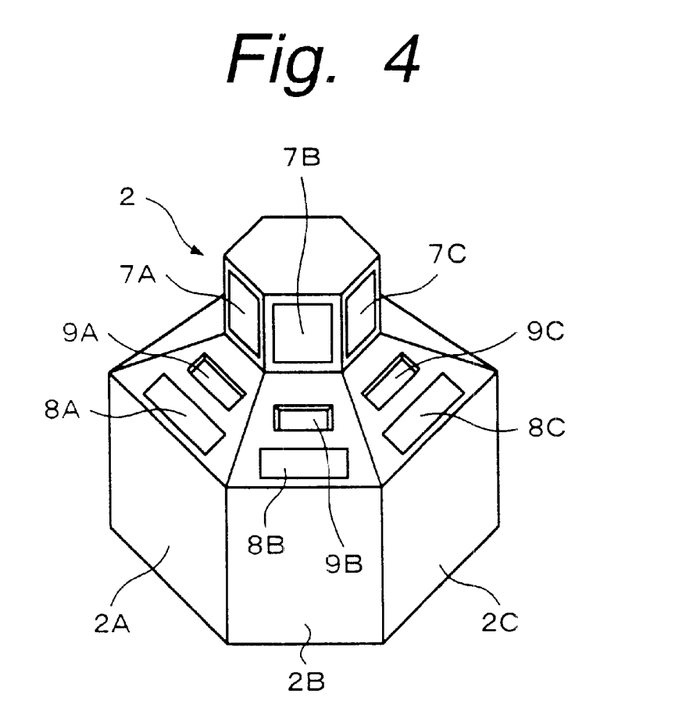
FIG. 4 is a perspective view showing the structure of a receiving unit according to a further embodiment of the present invention.

For example, as shown in FIG. 3, the receiving unit 2 has the displaying portion 7, the operating portion 8, and the portable terminal attaching portion 9. When the portable terminal unit 1 is directly connected to the portable terminal unit attaching portion 9 or when the portable terminal unit 1 is connected to the portable terminal unit attaching portion 9 through a connection cable, data is input and output between the receiving unit 2 and the terminal unit 1 and power is supplied from the receiving unit 2 to the terminal unit 1.

A plurality of users may access one receiving unit 2 with their portable terminal units. In an example shown in FIG. 4, one receiving unit 2 has a plurality of blocks 2A, 2B, 2C, and so forth. The blocks 2A, 2B, 2C, and so forth have displaying portions 7A, 7B, 7C, and so forth, operating portions 8A, 8B, 8C, and so forth, and attaching portions 9A, 9B, 9C, and so forth that attach the portable terminal units 1, respectively. In such a receiving unit 2, the portable terminal units 1A, 1B, 1C, and so forth are attached to the attaching portions 9A, 9B, 9C, and so forth of the blocks 2A, 2B, 2C, and so forth, respectively. Thus, one receiving unit 2 can be shared by a plurality of users.

As described above, when an attachment determining portion 40 determines that the terminal unit 1 has been attached to the receiving unit 2, electricity charging current is automatically supplied from a power supply terminal 13 to a secondary battery of the portable terminal unit 1. The electricity charging state of the secondary battery is displayed on the displaying portion 7 or the displaying portion 16. Corresponding to a menu displayed on the displaying portion 7 or 16, the user selects an item or a condition such as a data name or a data type with selection keys 14 and decides the selected item with an execution key 15. Thus, request information corresponding to the selected item or condition is uploaded or transmitted to the receiving unit 2 through the input/output terminal 12. In addition, information corresponding to the request information is downloaded to the record medium of the terminal 1.

When a jog dial as a rotatable operating portion is used instead of the selection keys and the execution key, since the user can select and decide a desired item by rotating and pressing a dial of the jog dial, the operations of the portable terminal unit 1 become easy. For the detail of the structure of the jog dial, refer to a related art reference disclosed in for example Japanese Patent Laid-Open Publication No. 8-203387.

After a message that represents that the downloading operation has been completed is displayed on the displaying portion 7 of the receiving unit 2 or the displaying portion 16 of the portable terminal unit 1, the user detaches the portable terminal unit 1 from the receiving unit 2. Thus, the user can cause information recorded in the portable terminal unit 1 to be displayed or output anytime and anywhere. When the user operates one of a plurality of operation keys 17 such as forward, stop, pause, and so forth for fast forward, playback, and rewind used for a tape recorder, he or she can control data that is displayed or that is output.

Figure 5:
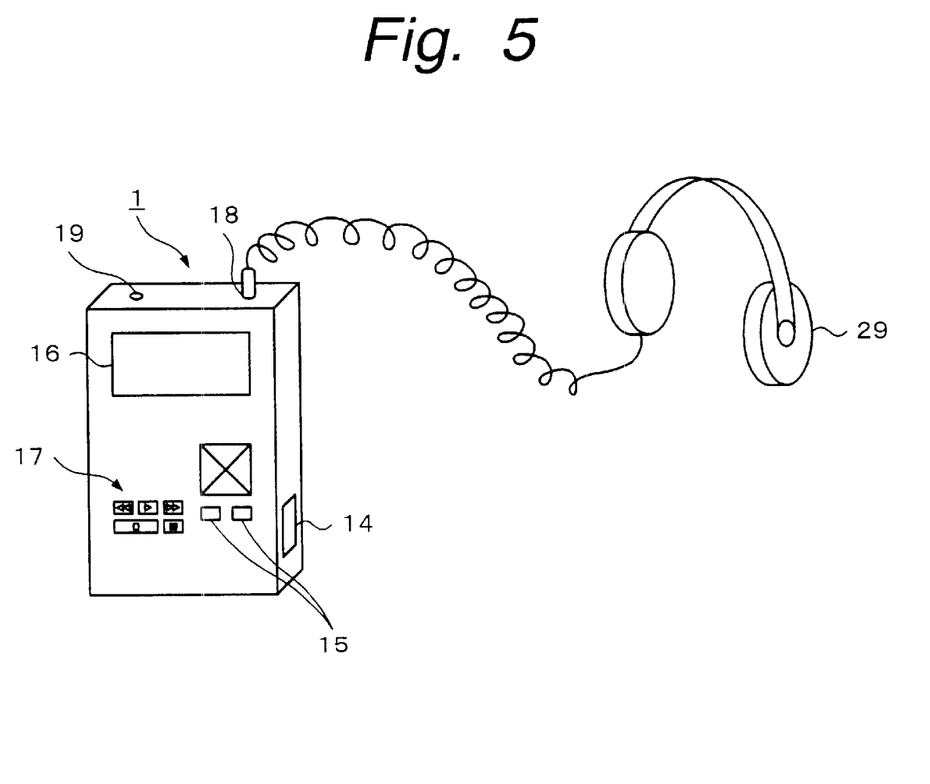
FIG. 5 is a perspective view showing the structure of a terminal unit according to the present invention, the terminal unit having a pair of headphones with which the user listens to sound.

In addition, as shown in FIG. 5, the portable terminal unit 1 has a headphone terminal 18 and a microphone terminal 19. With the headphone terminal 18, the user can listen to audio information with the headphones 20. In addition to the downloading operation of information stored in the transmitting unit 3 to the record medium of the terminal 1 through the communication line and the receiving unit 2 as shown in FIG. 1, the user can take an audio note with a microphone connected to the microphone terminal 19. When a record key is added to the operation keys 17, the portable terminal unit 1 can be used as an audio recorder.

Figure 6:
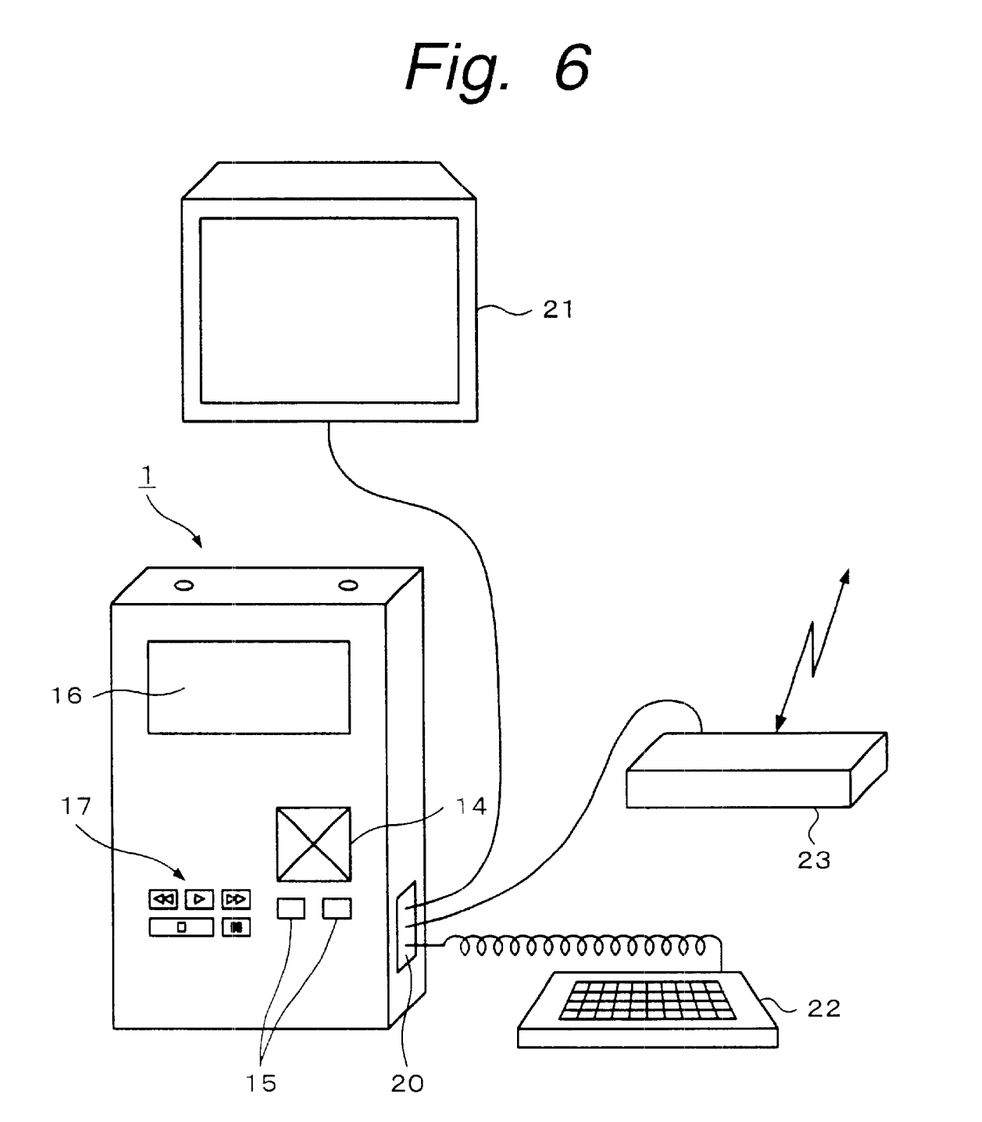
FIG. 6 is a perspective view showing the structure of which various input/output units are connected through connectors to a terminal unit according to the present invention.

In addition, as shown in FIG. 6, the portable terminal unit 1 has a connector 20 that allows a display unit 21, a keyboard 22, a modem/terminal adaptor 23 to be connected. When the display unit is connected to the connector 20, moving picture data, still picture data, and character data downloaded to the portable terminal unit 1 can be displayed on the display unit 21.

When the keyboard 22 is connected to the terminal unit 1, the user can easily select and input data. In addition, the user can input complicated conditions for selecting desired data. When the modem/terminal adaptor 23 is connected to the terminal unit 1, the terminal unit 1 can directly communicate with the transmitting unit 3 without need to use the receiving unit 2. In addition, the terminal unit 1 can communicate with another computer or another portable terminal unit 1. Thus, the user can easily exchange data with other users.

Alternatively, with a radio connection controller, the portable terminal unit 1 can be wirelessly connected to the transmitting unit 3.

Next, with reference to FIG. 7, the overall structure of the system will be described. Referring to FIG. 7, the portable terminal unit 1 has a controller 30. A bus 29 is connected to the controller 30. A ROM 27, a RAM 28, and a hard disk drive 30 as a record medium are connected to the bus 29.

A database menu of data stored in the transmitting unit 3 is stored in the ROM 27 or the RAM 28. In addition, request information that is selected and decided by the user is stored in the RAM 28. Data that is downloaded is stored on a hard disk of a hard disk drive 32.

The portable terminal unit 1 has the operation keys 17, the displaying portion 16, an input/output portion 26, and a audio data compressing/decompressing circuit 35. The input/output portion 26 inputs and outputs data between the portable terminal unit 1 and the receiving unit 2. The audio data compressing/decompressing circuit 35 performs an audio compressing process and an audio decompressing process. In addition, the portable terminal unit 1 has an I/O port 39. The I/O port 39 is connected to the connector 20.

Through the I/O port 39, the display unit 21, the keyboard 22, and the modem/terminal adaptor 23 can be connected to the portable terminal unit 1. The portable terminal unit 1 has a secondary battery 31. The secondary battery 31 supplies power voltage to each portion of the portable terminal unit 1.

The ROM 27 stores a unique owner ID data ID1 of the portable terminal unit 1. When music data recorded on the hard disk of the hard disk drive 32 is reproduced, the controller 30 compares the owner ID data ID1 stored in the ROM 2 with owner ID data ID2 added to the music data. Only when they match, the controller 30 allows the terminal unit 1 to output the music data or to reproduce the music data.

The receiving unit 2 has an input/output portion 24. Through the input/output portion 24, data is received from the transmitting unit 3 and request information is transmitted from the portable terminal unit 1 to the transmitting unit 3. The overall operations (including the transmitting and receiving operations) of the receiving unit 2 are controlled by a controlling portion 57. The receiving unit 2 has a power supply circuit 25. The power supply circuit 25 supplies electricity charging current to the secondary battery 31 of the portable terminal unit 1 through the power supply terminal 13 and the power supply terminal 11. A storing portion 56 buffers data that is exchanged between the transmitting unit 3 and the terminal unit 1.

The transmitting unit 3 has a storing portion 59, a searching portion 60, and an input/output portion 60. The storing portion 59 stores a large amount of data or a plurality of data programs. The searching portion 60 searches data corresponding to user's request information from the storing portion 59. The input/output portion 61 inputs and outputs data between the transmitting unit 3 and the receiving portion 2. The overall operations (including the transmitting operation and the receiving operation) of the transmitting operation 3 are controlled by the controlling portion 62. The transmitting unit 3 also has a collation processing portion 63, a data forming portion 64, and a fee charging processing portion 42. The collation processing portion 63 determining whether or not the user who tries to download data from the transmitting unit 3 is a valid user. The data forming portion 64 adds owner ID data, ownership transferred times data, and permitted ownership transfer data to data transmitted from the input/output portion 61. The fee charging processing portion 42 charges the user for data received from the transmitting unit 3 through the receiving unit 2.

The owner ID data of the data transmitted from the transmitting unit 3 is equivalent to the above-described ID data ID2. As will be described later, the collation processing portion 63 determines whether or not the user is a valid user corresponding to the owner ID data received from the portable terminal unit 1. For example, the collation processing portion 63 collates the owner ID data received from the terminal unit 1 with the ID data registered to the processing portion 63. The controlling portion 62 permits or prohibits an operation shown in FIG. 10 corresponding to the collated result.

The ROM 27 of the portable terminal unit 1 pre-stores the owner ID data and a program necessary for the operations of the terminal unit 1. When the terminal unit 1 is connected to the transmitting unit 3 through the communication line 5, contents data as a plurality of data programs stored in the storing portion 59 of the transmitting unit 3 is written to the RAM 28. When the user downloads data from the transmitting unit 3, with reference to a selection menu displayed on the displaying portion 16 corresponding to contents data stored in the RAM 28, he or she sets a search condition. The search condition is written as request information to the RAM 28. When the portable terminal unit 1 is attached to the attaching portion 9 of the receiving unit 2, the receiving unit 2 is connected to the transmitting unit 3 through the predetermined communication line 5 and the input/output portion 24 so that the receiving unit 2 communicates with the transmitting unit 3. Likewise, the transmitting unit 3 is connected to the bus 29 of the portable terminal unit 1 through the input/output portion 24 and the input/output portion 26 of the portable terminal unit 1.

An attachment determining portion 46 determines whether or not the terminal unit 1 has been attached to the attaching portion 9 of the receiving unit 2 corresponding to an output signal of a detecting switch (not shown) of the attaching portion 9 of the receiving unit 2. Alternatively, the controlling portion 57 may determine whether or not the terminal unit 1 communicates with the receiving unit 2 through the output terminals 6 and 12.

Thus, request information stored in the RAM 28 is automatically transmitted to the transmitting unit 3 through the input/output portions 26 and 24 under the control of the controller 30.

Request information received from the terminal unit 1 is input to the transmitting unit 3 through the input/output portion 61. The searching portion 60 searches data corresponding to the request information from the storing portion 59 and transmits the searched data to the receiving unit 2. When the searched data is transmitted to the receiving unit 2, the data forming portion 64 adds owner ID data, permitted ownership transfer times data, and fee charging data to the searched data. The overall operations (including the transmitting operation and the receiving operation) of the transmitting unit 3 are controlled by the controlling portion 62.

The storing portion 59 stores a plurality of data programs. Since the storing portion 59 should store a large amount of data, it is preferred to compress the data. The compressing method is for example modified DCT (Discrete Cosine Transform) method or TwinVQ (Transform domain Weighted Interleave Vector Quantization) method (trademark) as disclosed in Japanese Patent Laid-Open Publication Nos. 3-139923 and 3-139922. However, the present invention is not limited to such examples as long as data can be decompressed on the receiving unit 2 side.

Data is transmitted from the transmitting unit 3 and request information is transmitted from the portable terminal unit 1 through the receiving unit 2 corresponding to an original transmission protocol or TCP/IP (Transmission Control Protocol/Internet Protocol) of which packetized data is transmitted. The TCP/IP protocol is common in Internet.

Data corresponding to request information is transmitted from the transmitting unit 3 to the receiving unit 2 through the input/output portion 24. In addition, the data is supplied to the input/output portion 26 of the portable terminal unit 1 through the input terminals 6 and 12. After the receiving unit 2 transmits request information to the transmitting unit 3 and waits until the transmitting unit 3 transmits data corresponding to the request information to the receiving unit 2, electricity charging current is supplied from the power supply circuit 25 of the receiving unit 2 to the secondary battery 31 of the portable terminal unit 1. When the terminal unit 1 is attached to the attaching portion 9, the electric charging current is supplied from the power supply circuit 25 to the secondary battery 31 through the power supply terminal 11 of the receiving unit 2 and the power supply terminal 13 of the terminal unit 1. Thus, the electric charging current is charged to the secondary battery 31. Alternatively, an electricity charging circuit (not shown) may supply electricity charging current to the secondary battery 31. Thus, the electricity charging current is charged to the secondary battery 31. The electricity charging operation of the secondary battery 31 is controlled by the controlling portion 57 of the receiving unit 2.

Information such as fee charging data is extracted from the data that is input to the portable terminal unit 1 through the input/output portion 26. In addition, the data is supplied to the hard disk drive 32. Thus, the data is recorded to the hard disk. After the desired data is downloaded, a message that represents that the data has been downloaded is displayed on the displaying portion 7 of the receiving unit 2 or the displaying portion 16 of the portable terminal unit 1. Thus, the user can know that the desired data has been completely downloaded.

After the user has acknowledged the message, he or she detaches the portable terminal unit 1 from the receiving unit 2. Thus, the user can freely carry the portable terminal unit 1 anywhere.

When the user wants to reproduce data that has been downloaded to the portable terminal unit 1, he or she selects desired data from the list of a plurality of data programs recorded on the hard disk of the hard disk drive 32 with the selection keys 14 and the operation keys 17. Thus, the desired data is read from the hard disk of the hard disk drive 32 and supplied to the audio data compressing/decompressing circuit 35. The audio data compressing/decompressing circuit 35 decompresses the data. The resultant digital signal is supplied to a D/A converter 36. The D/A converter 36 converts the digital signal into an analog signal. The analog signal is supplied to the headphones 29. The user can listen to audio data recorded in the hard disk drive 32 with the headphones 29.

When an audio signal is recorded to the hard disk with the microphone 38, the user operates a relevant key of the operation keys 17. Thus, a signal corresponding to a record start command is supplied to the controller 30. The controller starts the recording operation. Thus, an analog audio signal that is output from the microphone 38 is supplied to an A/D converter 37. The A/D converter 37 converts the analog signal into a digital audio signal. The digital audio signal that is output from the A/D converter 37 is supplied to the audio data compressing/decompressing circuit 35. The audio data compressing/decompressing circuit 35 compresses the digital audio signal corresponding to one of the above-described compressing methods. The compressed signal is supplied to the hard disk drive 32 through the bus 29. The compressed signal is recorded on the hard disk of the hard disk drive 32. Thus, the user can record audio data to the hard disk with the microphone 38 as if he or she takes a note.

As described above, the display unit 21, the keyboard 22, and the modem/terminal adaptor 23 can be connected to the portable terminal unit 1 through the connector 20 and the I/O port 39. When the display unit 21 is connected to the connector 20, data as moving picture data, character data, and so forth that has been downloaded to the portable terminal unit 1 and stored in the hard disk drive 32 can be reproduced on a large screen of the display unit 21. The display unit 21 is for example a CRT (Cathode Ray Tube) display unit, a TFT (Thin Film Transistor) liquid crystal display unit, and a plasma display unit. When a head-mount type liquid crystal display unit is used, even if the user is moving, he or she can see data reproduced from the hard disk drive 32.

When the keyboard 22 is connected to the terminal unit 1 through the connector 20, the user can easily input request information and select desired data. In addition, the user can input a complicated command for required information so as to select data stored in the storing portion 59 of the transmitting unit 3. Moreover, with the keyboard 22, the user can easily input his/her opinion and information as character data. Thus, when character information is transmitted (uploaded) to the transmitting unit 3 through the keyboard 22, a meeting room can be provided on the network as a place for exchanging information and opinions of users.

When the modem/terminal adaptor 23 is connected to the terminal unit 1, the terminal unit 1 can directly communicate with the transmitting unit 3 without need to use the receiving unit 2. In addition, the portable terminal unit 1 can communicate with another computer. Thus, the user can easily exchange data with other users. When a portable telephone unit and a modem or the like are connected to the portable terminal unit 1, since the portable terminal unit 1 can transmit request information to the transmitting unit 3 anytime and anywhere. Thus, the on-demand function can be accomplished.

Figure 8:
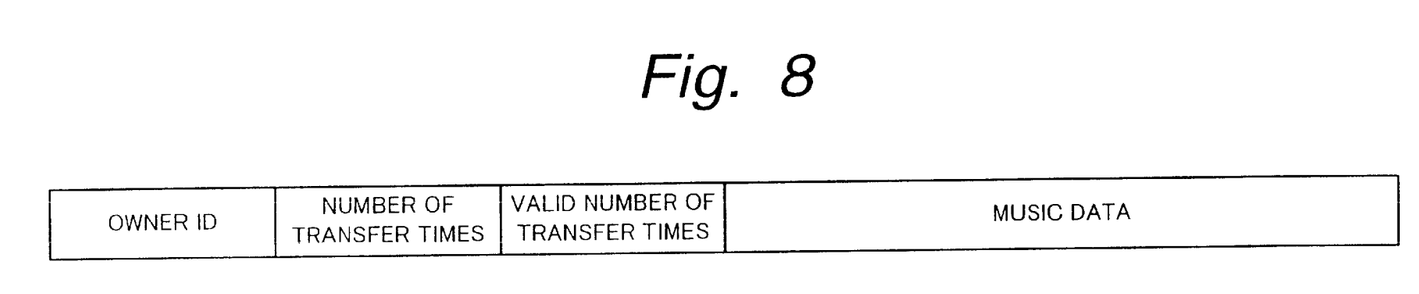
FIG. 8 is a schematic diagram for explaining a data structure according to the present invention.

FIG. 8 shows the data format of music data downloaded from the transmitting unit 3 to the portable terminal unit 1 through the communication line 5.

As shown in FIG. 8, data transmitted from the transmitting unit 3 (namely, data generated by the data forming portion 64) is composed of owner ID data, ownership transferred times data, and permitted ownership transfer times data, and music data corresponding to request information. The owner ID data is unique ID data ID that is stored in the ROM 27 of the terminal unit 1. Since the unique ID data ID of the unit 1 is pre-written to the ROM 27 at factory, the user cannot rewrite the unique ID data ID. The ownership transferred times data represents the number of times of which the ownership of music data stored in the portable terminal unit 1 has been transferred to other peoples. When the ownership of music data is transferred, not only the music data is transferred to a portable terminal unit 1 of a new owner, but the owner ID is changed. The permitted ownership transfer times data is used to limit the number of times of which the ownership of music data is transferred.

Figure 9:
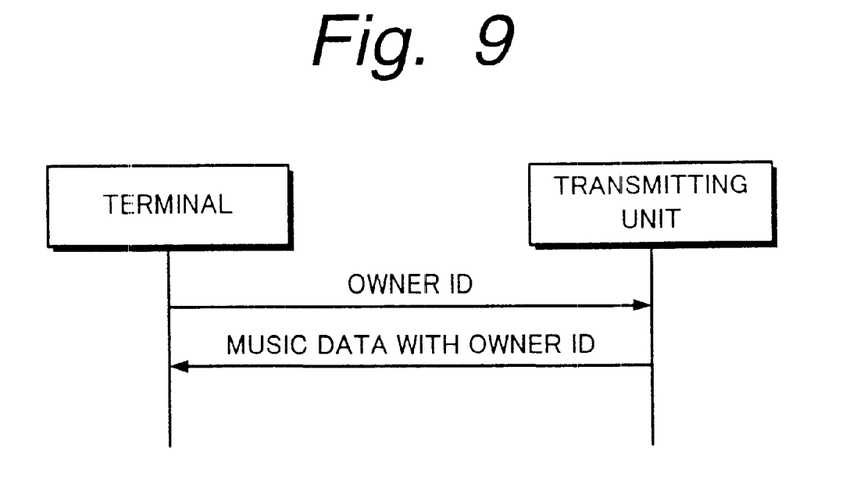
FIG. 9 is a sequence chart according to the present invention.

As shown in a sequence chart of FIG. 9, when the user wants to download desired music data from the transmitting unit 3 to the portable terminal unit 1, he or she connects the portable terminal unit 1 to the transmitting unit 3 through the receiving unit 2. At this point, owner ID data stored in the ROM 27 of the portable terminal unit 1 is transmitted to the transmitting unit 3. When the transmitting unit 3 side receives the owner ID data from the portable terminal unit 1, the data forming portion 64 adds the owner ID data to music data corresponding to the request information. The transmitting unit 3 transmits the resultant data to the portable terminal unit 1. The portable terminal unit 1 receives the music data with the owner ID data from the transmitting unit 3.

Figure 10:
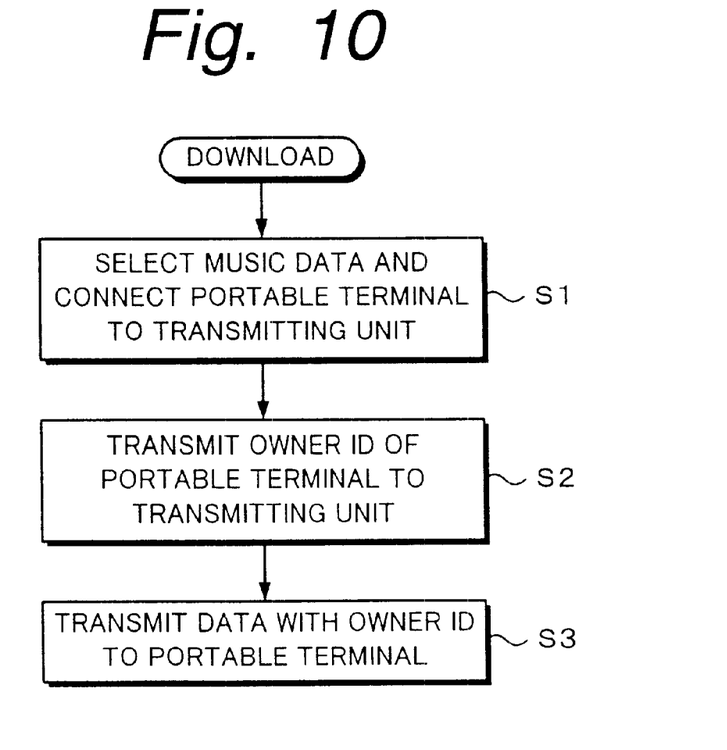
FIG. 10 is a flow chart for explaining a downloading operation according to the present invention.

FIG. 10 is a flow chart showing a process for downloading data (for example, music data) from the transmitting unit 3 to the portable terminal unit 1. As shown in FIG. 10, when the user wants to purchase (download) music data, he or she select desired music data, attaches the portable terminal unit 1 to the receiving unit 2. Thus, the receiving unit 2 is connected to the transmitting unit 3 through the communication line 5 (at step S1). When the portable terminal unit 1 is connected to the transmitting unit 3 through the receiving unit 2 and the communication line 5, the unique owner ID data of the unit 1 stored in the ROM 27 thereof is transmitted to the transmitting unit 3 (at step S2). The searching portion 60 of the transmitting unit 3 searches desired music data from a plurality of data programs stored in the storing portion 59 corresponding to the user's request information received from the portable terminal unit 1. The selected music data that has been read from the storing portion 59 is transmitted to the terminal unit 1 through the communication line (at step S3). At this point, as shown in FIG. 8, the data forming portion 64 adds the above-described data such as owner ID data to the music data that has been read from the storing portion 59.

In the flow chart shown in FIG. 10, the user selects desired music data and then connects the portable terminal unit 1 to the receiving unit 2. Alternatively, after the user attaches (connects) the portable terminal unit 1 to the receiving unit 2, he or she may select desired music data. At this point, the portable terminal unit 1 is connected to the transmitting unit 3 through the receiving unit 2. The collation processing portion 63 collates the owner ID data transmitted from the terminal unit 1 to the transmitting unit 3. Only when the collating processing portion 63 has determined that the owner ID data is valid, the controlling portion 62 permits a downloading process for downloading the relevant music data to the portable terminal unit 1 as shown in FIG. 10. When the collating processing portion 63 has not determined that the owner ID data is valid, the controlling portion 62 does not permit the downloading process shown in FIG. 10. The attachment determining portion 40 of the receiving unit 2 determines whether or not the portable terminal unit 1 has been connected to the transmitting unit 3 as follows. When the terminal unit 1 is attached to the receiving unit 2, the controlling portion 57 transmits an acknowledgment signal or acknowledgment data to the transmitting unit 3. The controlling portion 62 of the transmitting unit 3 determines whether or not the portable terminal unit 1 has been attached to the receiving unit 2 corresponding to the acknowledgment signal or acknowledgment data. The controlling portion 62 transmits command data to the portable terminal unit 1 corresponding to the acknowledgment signal or acknowledgment data so as to cause the portable terminal unit 1 to transmit the owner ID data to the transmitting unit 3. The terminal unit 1 transmits the owner ID data to the transmitting unit 3 corresponding to the command data. After the controlling portion 62 has completed the downloading process shown in FIG. 10, the fee charging processing portion 42 transmits fee charging data corresponding to the data amount of downloaded music data to the terminal unit 1.

Figure 11:
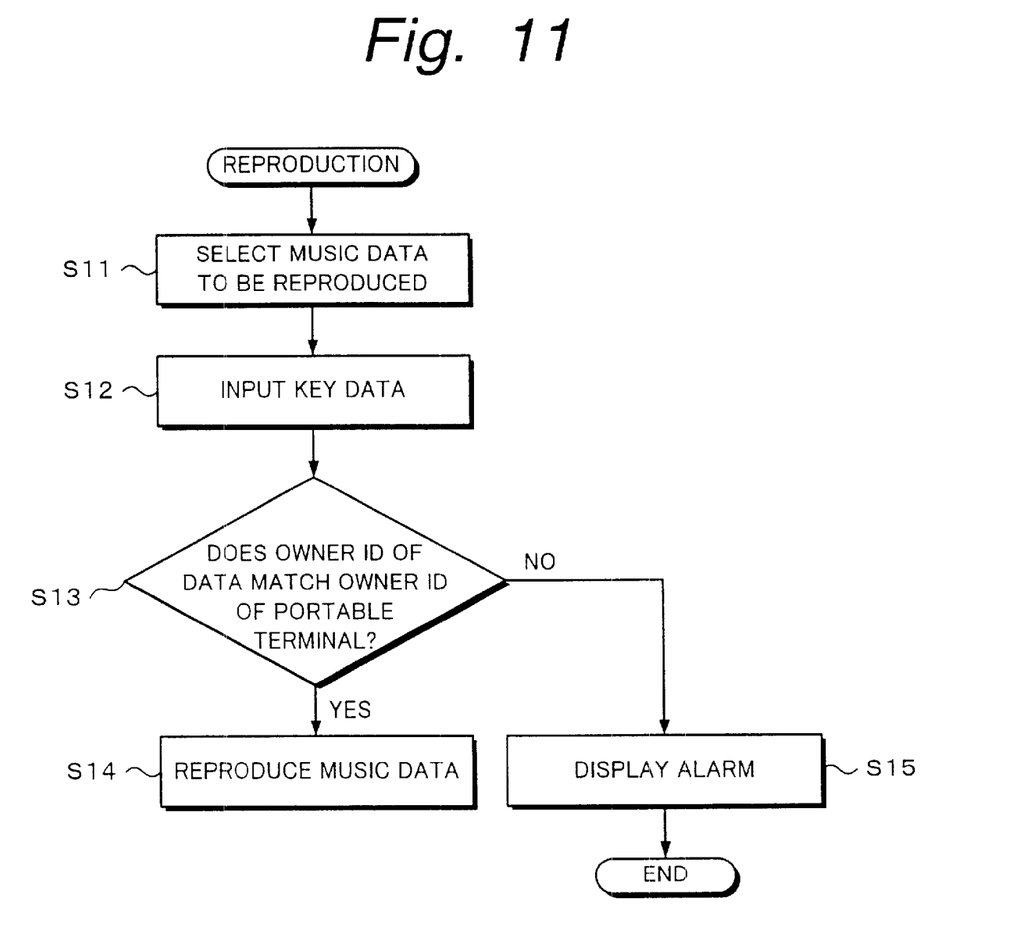
FIG. 11 is a flow chart for explaining a reproducing operation according to the present invention.

FIG. 11 is a flow chart showing a reproducing process. As shown in FIG. 11, when the user wants to reproduce music data downloaded to the portable terminal unit 1, he or she selects desired music data from information displayed on the displaying portion 16 (for example, list information of music data stored in the hard disk drive 32) (at step S11). The user inputs a music data number corresponding to the desired music data with the operation keys 17 or presses a key for a title corresponding to the desired music data (at step S12). When the user has input data corresponding to the desired music data, the controller 30 causes the hard disk drive 32 to read music data corresponding to the input key and compares the owner ID code added to the music data with the unique owner ID code stored in the ROM 27 of the portable terminal unit 1 (at step S13). When the owner ID code added to the music data matches the unique owner ID code stored in the ROM 27 of the unit 1, the controller 32 reproduces the music data that is read from the hard disk of the hard disk drive 32 (at step S14). When the owner ID code added to the music data does not match the unique owner ID code stored in the ROM 27 of the unit 1, the controller 32 causes the displaying portion 16 to display an alarm message (at step S15). In this case, the controller 30 completes the reproducing process without reproducing the music data that has been read from the hard disk drive 32.

Since owner ID data is added to music data that has been transmitted from the transmitting unit 3, even if music data is illegally copied, the music data cannot be reproduced. Thus, music data that has been downloaded can be prevented from being illegally copied. In other words, owner ID data is always added to music data that is downloaded. When music data that is downloaded is reproduced, only when the owner ID data of the music data matches the owner ID data stored in the portable terminal unit 1, the controller 30 permits the reproducing process for the music data that has been downloaded. Therefore, even if music data that has been illegally copied is transferred to another person, he or she cannot reproduce the music data with his/her portable terminal unit assigned different ID data.

Thus, when owner ID data is added to music data transmitted from the transmitting unit, as described above, not only the music data can be prevented from being illegally copied, but the owner ID data represents the owner of the music data that has been downloaded. Thus, the ownership of the music data can be transferred to another person. In other words, as with a secondhand market of compact discs, music data can be traded on the network.

Figure 12:
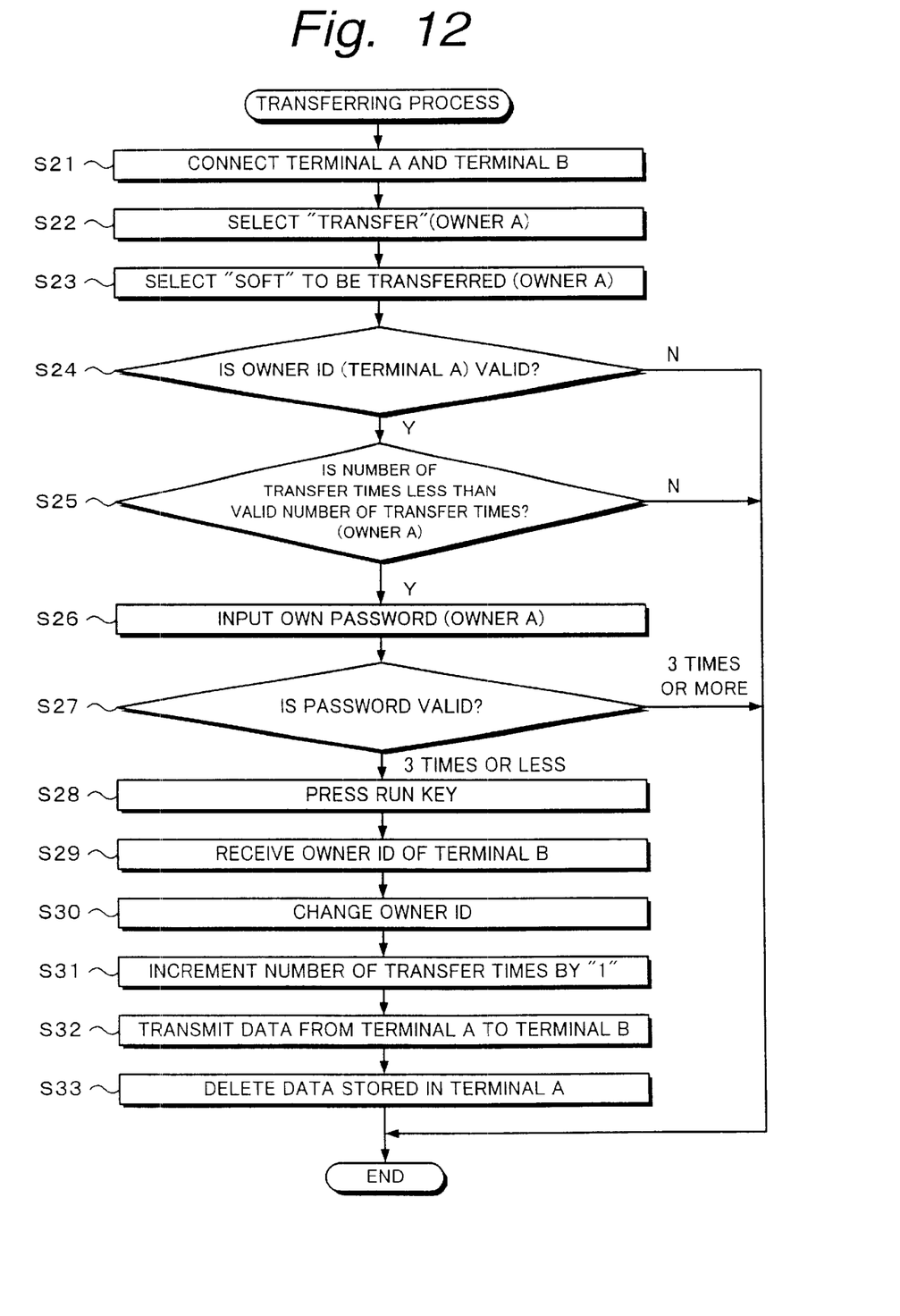
FIG. 12 is a flow chart for explaining a data ownership transferring operation according to the present invention.

FIG. 12 is a flow chart showing an ownership transferring process for transferring the ownership of music data. As shown in FIG. 12, when the owner ship of music data stored in a portable terminal unit 1A is transferred to another portable terminal unit 1B, the portable terminals 1A and 1B are attached to the receiving unit through the communication line 5 and connected (at step S21).

The user selects an operation mode for transferring the ownership of music data with the operation keys 17 (at step S22). With reference to the displaying portion 16, the user selects one from a plurality of music data programs stored in the hard disk drive 32 with the operation keys 17 and so forth so as to transfer the ownership of the selected music data program (at step S23).

The controller 30 reads the selected music data program from the hard disk of the hard disk drive 32 and compares the owner ID data of the music data with the owner ID data of the terminal unit 1A (at step S24). When the owner ID data of the music data do not match the owner ID data of the terminal unit 1A, the controller 30 determines that the music data that has been read from the hard disk drive 32 does not belong to a valid owner and completes the ownership transferring process. In this case, the controller 30 may cause the displaying portion 16 of the personal terminal unit 1 or the displaying portion 7 of the receiving unit 2 to display an alarm message.

When the owner ID data of the music data that has been selected and read from the hard disk drive 32 matches the owner ID data of the terminal unit 1A, the controller 30 detects the ownership transferred times data added to the music data that has been read and determines whether the value of the ownership transferred times data does not exceed the value of the permitted ownership transfer times data added to the music data (at step S25). When the value of the ownership transferred times data of music data that has been read exceeds the value of the permitted ownership transfer times data, the controller 30 completes the ownership transferring process. In this case, the controller 30 may cause the displaying portion 16 or the displaying portion 7 to display a message that represents that the ownership transferred times exceeds the permitted ownership transfer times.

When the value of the ownership transferred times data does not exceed the value of the permitted ownership transfer times data, the user inputs his/her password (at step S26). The controller 30 determines whether or not the input password matches a password stored in the terminal 1A (at step S27). When the input password matches the password stored in the terminal 1A, the controller 30 accepts the execution key input that causes the ownership transferring process to operate (at step S28). When the controller 30 has determined that the input password is incorrect, the controller 30 prompts the user for a correct password up to three times. When the password that the user has input three times is incorrect, the controller 30 completes the ownership transferring process. When the user purchases the portable terminal unit 1, he or she should input his/her password thereto. The password is stored in a memory area of the controller 30 or the RAM 28. When the user turns on the power of the portable terminal unit 1, it prompts the user for his/her password. Unless the input password does not match the password stored in the terminal unit 1, it does not start operating. Thus, even if the user lost the unit 1A, data stored therein can be prevented form being illegally copied.

When the user operates the execution key that causes the ownership transferring process to start, the owner ID data of the terminal unit 1B is transmitted from the terminal unit 1B to the terminal unit 1A (at step S29). The owner ID data added to music data transmitted from the terminal unit 1A to the terminal unit 1B is changed to the owner ID data of the terminal unit 1B (at step S30). In addition, the value of the ownership transferred times data of the music data transmitted and transferred from the terminal unit 1A to the terminal unit 1B is incremented by 1 (at step S31).

After the controller 30 has changes the owner ID data of music data transmitted and transferred from the terminal unit 1A to the terminal unit 1B and has incremented the value of the ownership transferred times data by 1, the music data is transmitted from the terminal unit 1A to the terminal unit 1B (at step S32). The music data transmitted from the terminal unit 1A is stored on the hard disk of the hard disk drive of the terminal unit 1B. Since the owner ID data of music data whose ownership had been transferred music data has been changed to the owner ID data of the terminal unit 1B, the terminal unit 1B can reproduce the transferred music data.

After music data has been transmitted from the terminal unit 1A to the terminal unit 1B and the ownership of the music data has been transferred, the controller 30 of the terminal unit 1A erases the music data whose ownership has been transferred to the terminal unit 1B from the hard disk drive 32 (at step S33) and completes the ownership transferring process.

The flow chart shown in FIG. 12 represents that the ownership of data stored in the terminal unit 1A is transferred to the terminal unit 1B. However, the flow chart shown in FIG. 12 may be applied to the case that data is simply transmitted from the terminal unit 1A to the terminal unit 1B. In this case, since ID data transmitted from the terminal 1A is changed to ID data of the terminal 1B, the terminal unit 1B can reproduce the data.

According to the present invention, each unit stores a unique owner ID. In addition, an owner ID is added to data. When data is downloaded, each unit transmits its owner ID to the transmitting unit. The owner ID is added to the data. When the ownership of data is transferred, the owner ID is changed to the owner ID of the new owner. When data is reproduced, the owner ID of the unit is compared with the owner ID of the data. Only when the owner ID of the unit matches the owner ID of the data, the data reproduction is permitted. Thus, the data can be protected. In addition, the ownership of data can be transferred. Industrial Utllization As described above, the data transmission apparatus, the data reproducing method, the terminal unit, and the transferring method for the data transmission apparatus according to the present invention are effective for an information transmission system that allows the copyright of music data circulated from a transmitting unit to a terminal unit to be protected.

What is claimed is:

1. A transmission apparatus, comprising:
 a transmitting unit having:
  a first storing portion for storing a plurality of data files,
  a data generating portion for appending first identification data to a desired data file selected by a user from the plurality of data files stored in the first storing portion, and
  a transmitter portion for transmitting the first identification data and the desired data file; and
 a terminal unit having:
  an operating portion for inputting selection data for selecting by the user the desired data file from the plurality of data files stored in the first storing portion, and for communicating the selection to the transmitting unit,
  a second storing portion for storing the desired data file to which the first identification data is appended and transmitted by the transmitter portion, and for storing second identification data unique to the terminal unit,
  a reproducing portion for reproducing the desired data file read from the second string portion, and
  a controlling portion for comparing the first identification data appended to the desired data file read from the second storing portion with the second identification data stored in the second storing portion and for controlling a reproducing operation of the reproducing portion in response to a result of the comparison.

2. The data transmission apparatus as set forth in claim 1, wherein the controlling portion compares the first identification data with the second identification data and causes the reproducing portion to start the reproducing operation only when the first identification data that is added to the data matches the second identification data.

3. The data transmission apparatus as se forth in claim 2, wherein the controlling portion compares the first identification data with the second identification data and causes the reproducing portion to stop the reproducing operation when the first identification data does not match the second identification data.

4. data transmission apparatus as set forth in claim 1, wherein the second storing portion includes:
 a data storing portion for storing the desired data file that is transmitted from the transmitting unit, and
 an identification data storing portion for storing the second identification data.

5. The data transmission apparatus as set forth in claim 1, wherein the content of the first identification data is the same as the content of the second identification data.

6. A data reproducing method for a data transmission apparatus, comprising the steps of:

causing a transmitting unit to read a desired data file selected by a user from a plurality of data programs stored in a first storing portion;

appending first identification data to the desired data file read from the first storing portion and causing the transmitting unit to transmit the first identification data and the desired data file;

selecting by the user, using an operating portion for inputting selection data at a terminal unit, from the plurality of data files stored in the first storing portion and communicating the selection to the transmitting unit;

causing the terminal unit to receive and store in a second storing portion the desired data file to which the first identification data is appended and transmitted by the transmitting unit and for storing second identification data unique to the terminal unit; and causing the terminal unit to compare the second identification data with the first identification data and controlling a reproducing operation of the desired data file read from the second storing portion in response a result of the comparison.

7. The data reproducing method as set forth in claim 6, wherein the step of causing the terminal unit to compare is performed by comparing the first identification data with the second identification data and causing the reproducing operation to start only when the first identification data matches the second identification data.

8. The data reproducing method as set forth in claim 7, wherein the step of causing the terminal unit to compare is performed by comparing the first identification data that is added to the data with the second identification data and causing the reproducing operation to stop when the first identification data does not match the second identification data.

9. The data reproducing method as set forth in claim 6, further comprising the steps of:

connecting the terminal unit to the transmitting unit in such a manner that the terminal unit communicates with the transmitting unit and causing the terminal unit to transmit the second identification data to the transmitting unit; and generating first identification data with the same content as the second identification data.

10. A transferring method for a data transmission apparatus, comprising the steps of:

connecting a first terminal unit and a second terminal unit in such a manner that the first terminal unit communicates with the second terminal unit, each of the first terminal unit and the second terminal unit having a storing portion for storing a plurality of data files, identification data and ownership transferred times data being appended to each of the data files;

causing, when one of the data files is transmitted from the storing portion of the first terminal unit to the storing portion of the second terminal unit, the second terminal unit to transmit the identification data of the second terminal unit to the first terminal unit; and changing the identification data appended to the data file that is read from the storing portion of the first terminal unit to the identification data of the second terminal unit and transmitting the data file of which the identification data of the first terminal unit has been changed to the identification data of the second terminal unit.

11. The transferring method as set forth in claim 10, further comprising the step of:

after the first terminal unit transmits the data file of which the identification data of the first terminal unit has been changed to the identification data of the second terminal unit, prohibiting the first terminal unit from reproducing the data file that is stored in the storing portion of the first terminal unit and of which the identification data of the first terminal unit has been changed to the identification of the second terminal unit.

12. The transferring method as set forth in claim 10, wherein the step of causing is performed by reading the ownership transferred times data of the data file that has been read from the storing portion of the first terminal unit and determining whether the first terminal unit is prohibited from transferring the data file to the second terminal unit based on the ownership transferred times data.

13. The transferring method as set forth in claim 12, wherein the step of causing is performed by causing the first terminal unit to stop transferring the data file to the second terminal unit when the ownership transferred times data of the data program that is read from the storing portion of the first terminal unit exceeds a predetermined value.

14. The transferring method as set forth in claim 12, wherein the step of causing is performed by causing the first terminal unit to start transmitting the data program to the second terminal unit when the ownership transfer times data that is read from the storing portion of the first terminal unit does not exceed a predetermined value.

15. The transferring method as set forth in claim 12, wherein the step of changing is performed by incrementing the ownership transferred times data representing a number of times of which the identification data of the first terminal unit has been changed to the identification data of the second terminal unit.

16. The transferring method as set forth in claim 10, wherein the step of causing is performed by comparing the identification data of the data file that is read from the storing portion of the first terminal unit with identification data of the first terminal unit and determining whether the first terminal unit is permitted to transfer the data file to the second terminal unit.

17. The transferring method as set forth in claim 16, wherein the step of causing is performed by comparing the identification data of the data file that is read from the storing portion of the first terminal unit with the identification data of the first terminal unit and for causing the first terminal unit to transfer the ownership of the data file to the second terminal unit when the identification data of the data program that is read from the storing portion of the first terminal unit matches the identification data of the first terminal unit.

18. The transferring method as set forth in claim 18, wherein the step of causing is performed by comparing the identification data of the data file that is read from the storing portion of the first terminal unit with the identification data of the first terminal unit and for causing the first terminal unit to not transfer the ownership of the data file to the second terminal unit when the identification data of the data file that is read from the storing portion of the first terminal unit does not match the identification data of the first terminal unit.

19. A transferring method for a data transmission apparatus, comprising the steps of:

connecting a first terminal unit and a second terminal unit in such a manner that the first terminal unit communicates with the second terminal unit, each of the first terminal unit and the second terminal unit having a storing portion for storing a plurality of data files, identification data and ownership transferred times data being appended to each of the data files;

reading, when the data file stored in the storing portion of the first terminal unit is transferred to the storing unit of the second terminal unit, the ownership transferred times data appended to the data program that is read from the first terminal unit; and determining whether the first terminal unit is permitted to transfer the data file to the second terminal unit based on the read ownership transferred times data.

20. The transferring method as set forth in claim 19, further including the step of causing the first terminal unit to stop transferring the data file to the second terminal unit when the ownership transferred times data of the data file read from the storing portion of the first terminal unit exceeds a predetermined value.

21. The transferring method as set forth in claim 19, further including the step of causing the first terminal unit to start transmitting the data file to the second terminal unit when the ownership transfer times data read from the storing portion of the first terminal unit does not exceed a predetermined value.

22. The transferring method as set forth in claim 19, wherein the step of determining is performed by incrementing the ownership transferred times data representing a number of times of which the identification data of the first terminal unit has been changed to the identification data of the second terminal unit.

23. The transferring method as set forth in claim 19, wherein the step of determining is performed by comparing the identification data of the data file that is read from the storing portion of the first terminal unit with the identification data of the first terminal unit and determining whether the first terminal unit is permitted to transfer the data file to the second terminal unit.

24. The transferring method as set forth in claim 23,
wherein the step of determining is performed by comparing the identification data of the data file that is read from the storing portion of the first terminal unit with the identification data of the first terminal unit and for causing the first terminal unit to transfer the ownership of the data file to the second terminal unit when the identification data of the data program that is read from the storing portion of the first terminal unit matches the identification data of the first terminal unit.

25. The transferring method as set forth in claim 23,
wherein the step of determining is performed by comparing the identification data of the data file that is read from the storing portion of the first terminal unit with the identification data of the first terminal unit and for causing the first terminal unit to not transfer the ownership of the data file to the second terminal unit when the identification data of the data file that is read from the storing portion of the first terminal unit does not match the identification data of the first terminal unit.

* * * * *